United States Patent Office 3,533,650
Patented Oct. 13, 1970

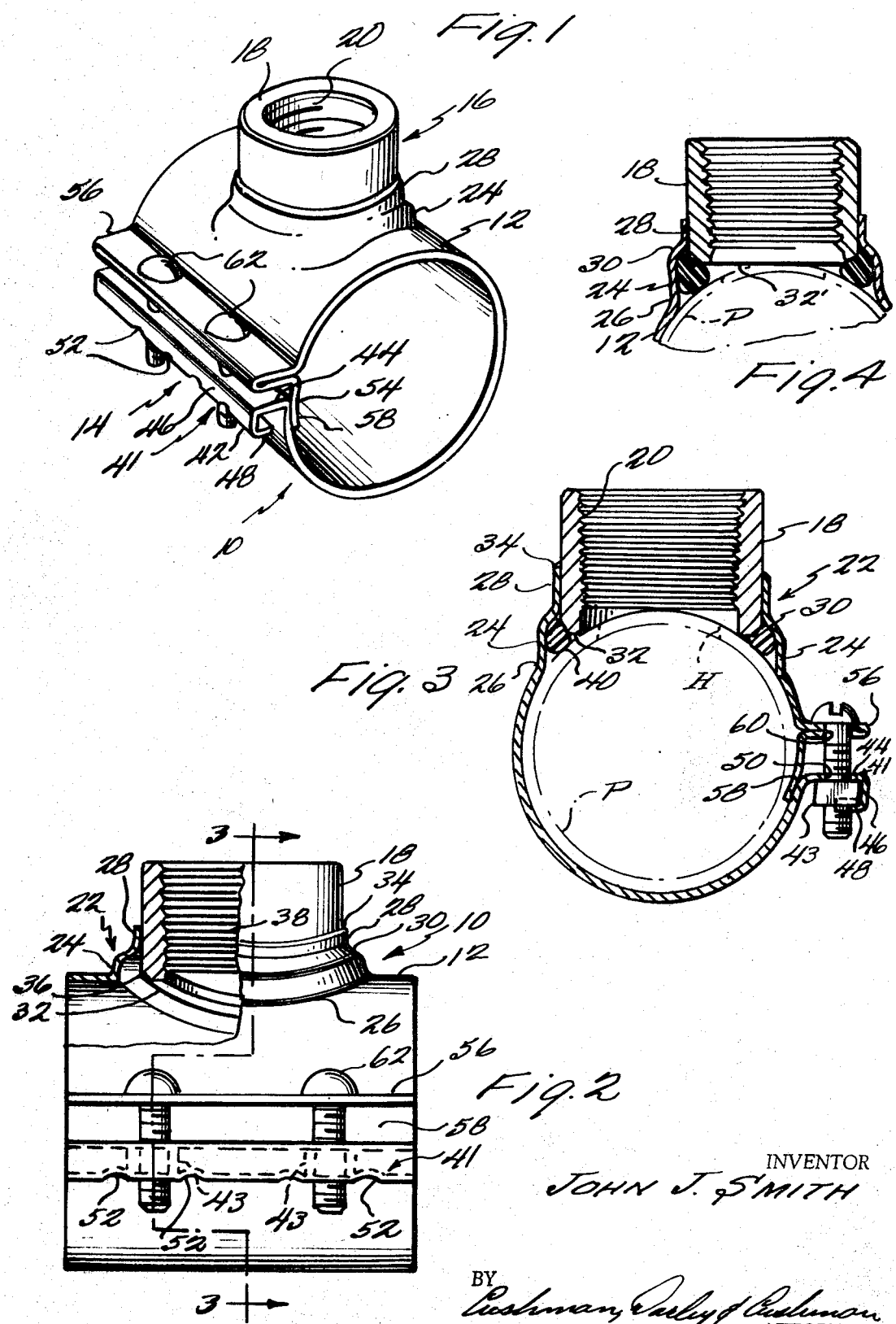

3,533,650
PIPE CLAMP FOR PLASTIC OR THIN WALLED PIPE
John J. Smith, Decatur, Ill., assignor to Mueller Co., Decatur, Ill., a corporation of Illinois
Filed Aug. 13, 1968, Ser. No. 752,223
Int. Cl. F16l *5/00*
U.S. Cl. 285—197                        9 Claims

ABSTRACT OF THE DISCLOSURE

A pipe clamp for plastic or thin walled pipes and the like, the clamp being of the flexible band type and so arranged as to completely confine or encircle the pipe thereby reducing the tendency of the same to creep or deform as in the case of only partial confinement. The flexible band is provided at its ends with clamping means which eliminate the necessity of using a wrench when installing the clamp on a pipe in confined areas. A service outlet is provided on the flexible band whereby the pipe clamp may be used in the connection of a main pipeline to a service pipeline or the like, the service outlet being so designed as to provide means for support and confinement of an annular gasket member thereby eliminating the necessity of providing a gasket member to cover the entire interior surface of the band.

---

The present invention relates generally to pipe clamps of the type utilized in providing a connection between a main pipeline and a service pipeline or the like. More particularly, the pipe clamp of the present invention is of the flexible band type especially useful on plastic or thin walled pipes, or the like.

Various means have been heretofore proposed to facilitate the connection of a service line to a main pipeline at a selected point with a minimum disturbance of the main pipeline. With the advent of plastic pipe and thin walled pipe, the prior proposed clamps have in many instances proved unsatisfactory as there was a tendency of the pipe to deform due to the fact that the prior pipe clamps only partially confined the periphery of the pipe to which they were attached. In an effort to completely confine the pipe, such prior pipe clamps were provided with separate metal shims for bridging the gap between the ends of the band, the shim functioning to confine the gasket material applied over the inner surface of the band and also to apply uniform distribution of pressure by the bands on the pipe. Such prior arrangements were not only costly to manufacture but they also did not provide good clamping arrangements for the smaller diameter pipes in the order of six inches or less. The clamping arrangements for such prior pipe clamps necessitated the use of rigid lugs attached to the ends of the band, the lugs receiving nuts and bolts which required the use of both a screwdriver and a wrench in applying the clamp to the pipe.

Prior service outlet devices for band type pipe clamps required the interior of the band to be completely covered with a gasket material, thus increasing the costs of manufacture of the clamp. Such previous arrangements also proved unsatisfactory unless special means were provided to prevent flow of the gasket from beneath the ends of the band after initial clamping. Additionally, the service outlet, at the position it was connected to the band around the hole formed therein, was not provided with a seal other than the seal of the weld holding the same and, consequently, if a crack developed in the weld or adjacent thereto, there was no secondary protection by the gasket secured about the interior of the band.

The present invention contemplates a pipe clamp for use with plastic or thin walled pipes which obviates prior disadvantages associated with such prior clamp means. The advantages of a pipe clamp of the flexible band type provided with a service outlet which completely encircles the pipe is readily apparent as the flexible band adapts itself to various discrepancies and irregularities in pipe diameters and sizes. Utilizing a clamping means for the flexible band, which requires the use of only a screwdriver to draw the band means tightly about the pipe, enables the pipe clamp to be applied in cramped quarters to a pipe, the band means applying a uniform distribution of pressure to the periphery of the pipe, thus preventing the pipe from creasing or deforming. The particular arrangement of clamping means for the band of the pipe clamp contemplates one of the band ends fixedly holding or anchoring the nut means in a predetermined position with the other of the band means being arranged to receive bolts for threading into the nut means, thus, eliminating the use of lugs and the like and thereby decreasing the overall weight of the construction. Service outlet means are provided on the flexible band which will properly orient and support an annular gasket member for sealing against the pipe, the gasket member being confined in such a manner as to form a tighter seal under line pressure. Additionally, by providing a simple annular gasket for surrounding the hole in the pipe as well as the service outlet means, less pressure need be applied to provide a proper uniform clamping action of the band means about the pipe. The confinement of the annular gasket member is such that there can be no flow of the gasket member from beneath the band once the clamp is installed which would result in a reduction in the clamping action of the band about the pipe.

Therefore, an object of the present invention is to provide an improved pipe clamp having a surface outlet on a flexible band, the service outlet and the clamping means for the flexible band providing a simple and effective pipe clamp for plastic or thin walled pipes and the like.

Another object of the present invention is to provide an improved pipe clamp of the flexible band type which may be effectively installed in areas of limited space.

Still another object of the present invention is to provide an improved pipe clamp of the band type in which the gasket for the service outlet is confined, thereby preventing unlimited flow of the same when subjected to line pressure.

A still further object of the present invention is to provide an improved pipe clamp for plastic and thin walled pipes, which is inexpensive to manufacture and yet functions to accommodate variations in discrepancies or irregularities in pipe surface as well as variations in pipe dimensions.

These and other objects and advantages will appear more fully in the following specification, claims and drawings in which:

FIG. 1 is a perspective view of a pipe clamp made according to the present invention;

FIG. 2 is a side elevational view of the pipe clamp of FIG. 1 looking from the left of FIG. 1, the view being partly in section for purpose of clarity;

FIG. 3 is a sectional view taken on the line 3—3 of FIG. 2; and

FIG. 4 is a fragmentary sectional view similar to FIG. 3 but illustrating a modified outlet member or bushing for the service outlet means of the flexible band of the pipe clamp.

Referring now to the drawings wherein like character or reference numerals represent like or similar parts, FIG. 1 illustrates a perspective view of a service clamp, generally designated at 10, embodying the principles of the present invention. The clamp 10, which may be utilized to provide a service connection for a service pipe from a main line pipe or may be used to provide a branch line to a main line pipe when it is necessary to repair a corporation stop or the like, includes a flexible metal band 12, clamp means 14 at the ends of the band 12, and a service side outlet means 16.

The flexible band 12 is of uniform width and is preferably made of stainless steel or the like. The length of the band 12, as will be described later in the specification, must be such that it completely encircles a pipe P shown in broken line in FIGS. 3 and 4. The service outlet means 16 includes an annular cylindrical outlet member or bushing 18 preferably made of stainless steel and interiorly threaded as indicated at 20.

As best shown in FIGS. 2 and 3, the flexible metal band 12 is provided with a circular opening or hole which is defined by an upset, generally annular wall 22 arranged to receive the cylindrical outlet member 18. The upset, generally annular wall is integral with the band and is pressed therefrom in a shape so that it is provided with a generally cylindrical base portion 24 joined to the band by a fillet 26 and a generally cylindrical outer end portion 28 of less diameter than the diameter of the base portion 24. A shoulder 30 formed during the pressing operation connects the base portion 24 with the outer end portion 30.

The annular cylindrical outlet member or bushing 18 has a diameter substantially equal to the interior diameter of the outer end portion 28 of the upset wall 22. As will be noted in FIGS. 2 and 3, the outlet member 18 has its lower end portion press fitted into the outer cylindrical portion 28 with its lower end 32 terminating beneath the shoulder 30 of the upset wall 22. After the outlet member 18 has been press fit into the cylindrical portion 28 as described above, it is then welded, as indicated at 34, to the outer end portion 28 by a heliarc weld or the like. The lower end 32 of the cylindrical outlet member 18 has its outer edge bevelled as indicated at 36. By extending the lower end portion of the outlet member 18 into the outer portion 28 of the upset wall 22 to a position past the shoulder 30, an annular groove 38 is defined between the exterior of the lower end portion member 18 and the interior surface of the base portion 24 of upset wall 22 for reception of an annular resilient gasket member 40 made of a flowable material. Preferably, the annular gasket member 40 is an O-ring and, as shown in FIG. 3, it is arranged to provide a seal between the outlet means 16 and the pipe P around the hole H in the pipe P. By confining the O-ring 40 in this manner, line pressure of the pipe P urges the O-ring 40 tightly into the groove 38 and, thus, since the O-ring is confined except for the area exposed to line pressure, it has no place to flow once it fills the annular groove. It will also be noted that the O-ring 40 provides an additional or secondary seal between the interior of the outer end portion 28 of the upset wall and the exterior of outlet member 18 and should the weld 34 crack or develop a pinhole leak, the O-ring will function to prevent leakage in this area.

The novel clamping means 14 provided at the ends of the flexible metal band 12 insures uniform pressure distribution to the pipe P as well as provides a clamping means which makes installation of the pipe clamp 10 easy in restricted or crowded areas where a wrench cannot be used. In more detail, the band 12 has one of its ends 42 formed to define a channel section generally designated at 41 for reception of nuts 43. To accomplish this, the band 12, which is arcuately formed in relaxed position so that it can be applied around the pipe P, has one of its end portions bent outwardly as indicated at 44, backwardly as indicated at 46 and then toward, but terminating short of, the exterior surface of the band 12, as indicated at 48, to define the channel section 41 of a size to receive and confine the nuts 43. The portion 44 of the channel section 41 is provided with holes 50 to align with the threaded bores in the nuts 43. In order to fixedly secure the nuts 43 within the channel and in alignment with the holes 50, the channel section 41 is dimpled or crimped along one of its corner edges as indicated at 52 on each side of the nuts 43 once the nuts have been properly positioned within the channel section. This prevents the nuts 43 slipping lengthwise from the channel section 41 whereas the cross-sectional size of the channel prevents the nuts from turning.

While the channel section 41 has been described as being provided with a plurality of individual nuts 43, it will be appreciated that a nut bar having a cross-section of similar configuration to the cross-section of the channel section could be provided within the channel section, the nut bar having tapped holes provided therein and aligned with the holes 50. The nut bar could be retained in position by dimpling the channel section along a corner edge of the same at each of the ends of the nut bar.

The other end portion 54 of the band 12 is bent outwardly of the same and back inwardly to define a double fold as indicated at 56, the double fold 56 terminating in a tab 58 adapted to overlap the inner surface of the band adjacent the fold for the portion 44. The double fold 56 is provided with a plurality of holes 60 therethrough aligned with the holes 50 and the nuts 43. Holes 60 receive bolts 62 which are adapted to be threaded into the nuts 43 for drawing the band 12 tightly about the pipe P. Since the tab 58 extends across the space between the double fold 56 and the channel section 41 of the band 12, the pipe P cannot deform in this area and, since this provides for a uniform distribution of pressure to the pipe P, it also will not creep.

It will be noted by reference to FIGS. 2 and 3 that the inner end 32 of the outlet member 18 is contoured to the general shape of the exterior of the pipe P. By contouring the end 32 of the outlet member 18, a large outlet member having a large interior diameter may be used on a clamp for a small diameter pipe. Where a small diameter outlet member 18 is desired to be used in a clamp for a large diameter pipe, the inner end of the outlet member 18 need not be contoured but may be provided with an inner edge 32′ (FIG. 4) which lies in a plane normal to a radian of the curved band member 12.

The objects and advantages of the pipe clamp construction of the present invention have been fully and effectively accomplished by the pipe clamp described and disclosed in the drawings. However, it will be realized the foregoing specific embodiments have been shown and described only for the purpose of illustrating the principles of the invention and are subject to some changes or modifications without departing from the spirit of such principles.

Therefore, the terminology used in the specification is for the purpose of description and not limitation, the spirit and scope of the invention being defined in the claims.

What is claimed is:

1. A clamp for connecting a main pipeline with a service pipeline comprising: a flexible metal band having clamp means at its ends for drawing the band tightly about a main pipeline, means providing a hole in said flexible metal band, said last-mentioned means including an upset, generally annular wall integral with the band, said upset wall having an annular base portion joining the band with a fillet and a cylindrical outer end portion separated from said base portion by an annular shoulder, said outer end portion having a diameter less than the diameter of the base portion; an annular cylindrical member having an exterior diameter substantially equal to the interior diameter of the outer end portion of said upset wall, said annular cylindrical member having one end portion received within said outer end portion of said upset wall, said one end portion extending beyond the annular shoulder between said outer end portion and said base portion of said upset wall and terminating at a spaced distance therefrom to thereby define with said annular shoulder and said base portion an annular groove; weld means securing said cylindrical member to the outer end portion of said upset wall, and a gasket member of resilient flowable material carried in said annular groove and making contact with the exterior of the main pipeline, said gasket member being completely confined by said annular groove and the exterior of the main pipeline except in an area exposed to line pressure of said main pipeline, whereby the line pressure urges said gasket member into tighter sealing engagement within said groove and against the exterior of said main pipeline.

2. A clamp as claimed in claim 1 in which said one end portion of said annular cylindrical member terminating past said shoulder is bevelled exteriorly of the same.

3. A clamp as claimed in claim 2 in which said one end of said annular cylindrical member is contoured complementary to the exterior of the main pipeline.

4. A clamp as claimed in claim 1 in which said flexible metal band is of sufficient length to have its ends overlap when said clamp means draws the band tightly about the main pipeline thereby completely confining the same.

5. A clamp as claimed in claim 1 in which said clamp means includes a plurality of nuts fixedly supported in a predetermined position by one of the ends of said flexible metal band and a plurality of bolts extending through the other end of said flexible metal band and received in said nuts.

6. A clamp as claimed in claim 5 in which the other end of said metal band carrying said bolts includes a double folded portion for receiving said bolts and a tab portion to overlap the interior surface of the other end of said band.

7. A clamp as claimed in claim 1 in which said gasket member is an O-ring.

8. A clamp comprising a flexible metal hand arcuately shaped and of sufficient length to circumferentially completely encircle a pipe, said band, when encircling the pipe, having one end portion formed to extend outwardly, backwardly, and then inwardly toward but terminating short of the band to define a partially closed channel section having an axis parallel to the axis of the pipe, said band having its other end portion provided with a flange formed by a double fold and with a tab extending therefrom defining a terminal end of said other portion, said flange extending outwardly of the band and said tab overlapping the said one end portion of the band when said band encircles the pipe, said flange having a plurality of spaced holes therethrough and said channel section having a plurality of spaced holes aligned with the holes of said flange; a plurality of nuts confined and supported in said partially closed channel section; means to retain said nuts in said channel section in fixed spaced positions of alignment with the holes therein, said retaining means including a dimple on each side of each of said nuts; a plurality of bolts extending through the holes in said flange for reception in said nuts to tightly draw the band about the pipes; and a service side outlet means on said flexible band for connecting the pipe encircled by said band with a service pipe, said service side outlet means including means providing a hole in said flexible metal band, said last-mentioned means including an upset, generally annular wall integral with the band, said upset wall having an annular base portion joining the band and a cylindrical outer member separated from said base portion by a shoulder, said outer end portion having a diameter less than the diameter of the base portion, an annular cylindrical member having an exterior diameter substantially equal to the interior diameter of the outer end portion of said upset wall, said cylindrical member having one end portion received within the outer end portion of said upset wall, said one end portion terminating past the shoulder between said outer end portion and said base portion of said upset wall to thereby define therewith an annular groove, weld means securing said cylindrical member to the outer wall portion of said upset wall, and a gasket member of resilient flowable material carried in said groove for making contact with the exterior of the pipe encircled by said band.

9. A pipe clamp as claimed in claim 8 in which said gasket member is an O-ring confined by the groove and by the pipe whereby line pressure from the pipe will urge the same into sealing engagement with the groove and pipe.

References Cited

UNITED STATES PATENTS

| 1,057,708 | 4/1913 | Chapin | 285—197 |
| 1,373,673 | 4/1921 | Ritter | 24—279 |
| 1,864,339 | 6/1932 | Church | 285—420 X |
| 3,272,534 | 9/1966 | Smith | 285—197 X |
| 3,355,794 | 12/1967 | Adams | 285—197 X |

FOREIGN PATENTS

| 147,060 | 9/1935 | Austria. |

DAVID J. WILLIAMOWSKY, Primary Examiner

W. L. SHEDD, Assistant Examiner

U.S. Cl. X.R.

285—373